Aug. 19, 1930.  F. SCHABLOSKI  1,773,122
AUXILIARY HAY LOADER ATTACHMENT
Filed July 5, 1927
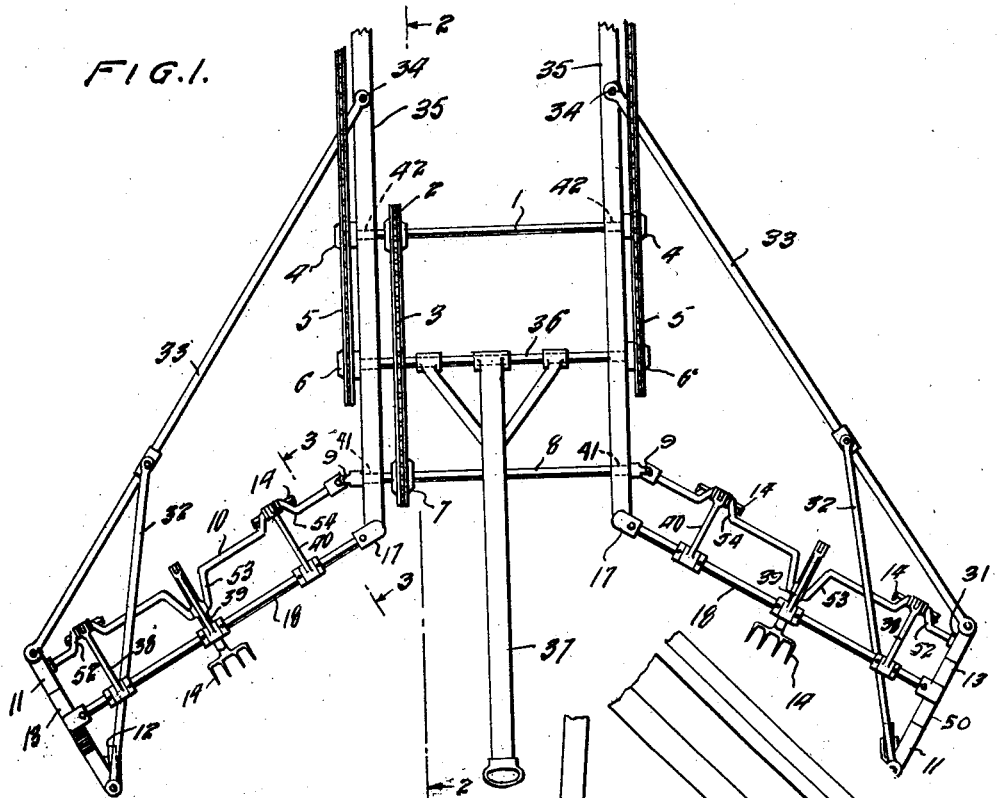
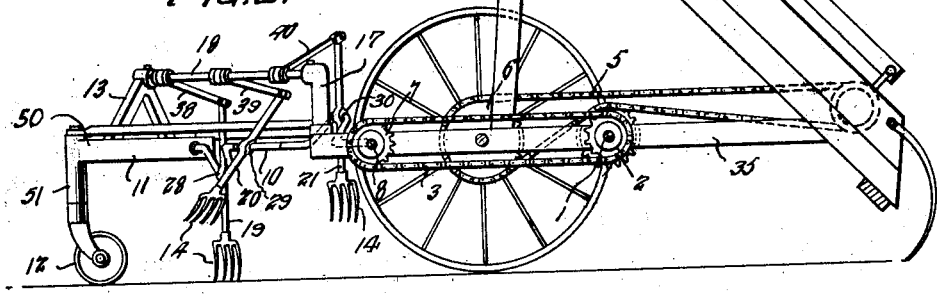
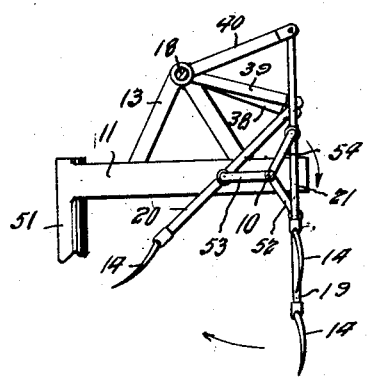
Inventor
FRANK SCHABLOSKI
Semmes + Semmes
Attorneys Patented Aug. 19, 1930

1,773,122

UNITED STATES PATENT OFFICE

FRANK SCHABLOSKI, OF BOVINA, NEW YORK

AUXILIARY HAY-LOADER ATTACHMENT

Application filed July 5, 1927. Serial No. 203,596.

This invention relates to agricultural machinery and more particularly to an apparatus adapted to be attached to various types of hay loaders to increase their effectiveness.

Heretofore attempts have been made to increase the efficiency and effectiveness of hay loaders by placing various extensions thereon. Many of the proposed extensions have been ineffectual to carry out their purpose of increasing the efficiency of the loader or rake to which they have been attached. One of the principal difficulties encountered has been the detrimental effects caused by the hay, straw, or whatever material was being loaded, working its way into the machinery in such a manner as to cause binding of the moving parts. Whenever binding of the moving parts occurs, the machine is put out of service until the bound parts are cleared of the clogging material.

Another difficulty arising in the use of the heretofore proposed extensions to hay loaders has been the lack of efficiency in the actual operation of the device, that is to say, much of the material gathered by the auxiliary device or extension has been dropped, or lost, due to the ineffectual facilities provided for handling the gathered material.

The devices heretofore proposed to increase the gathering area of the hay loaders have been permanently fixed thereto. This is a decided disadvantage in most instances as the modified hay loader is bulky and hard to handle; also the housing problem of the hay loader is increased, since such a bulky machine requires a large storage space. Sometimes it is desirable to use the hay loader without the extensions thereon. If the extensions are permanently fixed to the loader, the entire machine would have to be used where the loader itself would be sufficient. It can be readily seen that such practice is decidedly uneconomical.

An object of this invention is to devise an attachment for hay loaders which, in combination with a hay loader, will produce an apparatus lacking many of the disadvantages inherent in machines heretofore produced.

Another object of this invention is to devise an attachment for hay loaders that may be attached or detached at will with the exertion of a minimum amount of effort on the part of the operator.

Another object of this invention is to devise an attachment for hay loaders that will increase the effective area covered by a hay loader during its operation and thus increase its overall efficiency.

With these and other objects in view which may be incident to my improvements, the invention consists in the parts and combinations, to be hereinafter set forth and claimed, with the understanding that the several necessary elements comprising my invention, may be varied in construction, proportions and arrangement, without departing from the spirit and scope of the appended claims.

My invention comprises a plurality of frame members, adapted to be detachably connected to the body portion of a hay loader. Each of the frame members is provided with a crank shaft adapted to be rotated by power supplied from the hay loader. Each of the crank members of the crank shafts carries an arm, to one end of which is attached a fork member. The other ends of the arms are connected by suitable linkage with the frame members, in such a manner as to permit the fork members, upon rotation of the crank shafts, to pick up the hay and other material to be loaded, and throw the same into the path to be traversed by the hay loader.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a plan view of a portion of a hay loader with the gathering attachments arranged in operative position.

Figure 2 is a sectional view taken on line 2—2 of Figure 1 showing the fork operating mechanism and the power transmitting arrangement for driving the same.

Figure 3 is a sectional view taken on line

3—3 of Figure 1 showing the fork arrangement.

Referring to the drawings, Figure 1 shows a portion of a hay loader having a frame 35, mounted on suitable wheels, not shown. The hay loader may be of any conventional type and may be drawn by means of the draw-bar 37, by a tractor or a team, or it may be self-propelled. For purposes of illustration, a hay loader adapted to be drawn by a tractor or a team will be described.

Detachably connected to each side of the frame 35 of the hay loader is a frame member 50. The frame members 50 each comprise an end member 11 which is suitably connected by braces 18, 32 and 33 to the frame 35 of the hay loader. As is clearly shown in Figure 1, brace 33 extends from the rear of the end member 11 to the frame 35 and is detachably connected thereto by means of a bolt or other suitable securing means 34. The brace 32 extends between the forward end of the end member 11 and an intermediate point of the brace 33. The combined shaft and brace 18 extends between a suitable bracket 17 mounted on the forward portion of frame 35 and a bracket 13 carried by the end member 11. When assembled, the entire frame 50 is rigidly held in position by means of the several brackets 18, 32 and 33.

To prevent any unnecessary strains being applied on the hay loader to which the gathering attachment is connected, the frames 50 are supported on casters 12 attached to the end members 11, by means of suitable pivoted forked supports 51.

The frame 35 of the hay loader carries a shaft 36 mounted in suitable bearings. Attached to the shaft 36 is a pair of sprocket wheels 6. The shaft 36 may be connected to wheels, not shown, which support the hay loader, or the shaft 36 may be extended past the sprockets 6 and the supporting wheels may be attached thereto. By any arrangement desired, power is supplied to the sprockets 6. Power for operating the hay loader is transmitted from the sprockets 6 by means of chains 5.

In the application of my invention to a hay loader, a shaft 1 is mounted in suitable bearings 42 supported on the frame 35 of the hay loader. A pair of sprockets 4 are fixedly mounted on the shaft 1 and are adapted to engage with the chains 5 passing over the sprockets 6. Power is transmitted from the chains 5 through sprockets 4 to shaft 1, and to a sprocket 2 fixed on shaft 1. A shaft 8 is mounted in bearings 41 on the forward part of the frame 35 of the hay loader and carries a sprocket 7 which is connected with sprocket 2 by means of a chain 3. Shaft 8, which is connected by chains and sprockets with shaft 36, supplies all power necessary for operating the attachment for throwing hay or other material to be gathered into the path of the hay loader.

The end member 11 of each frame 50 is provided with a bearing 31 which carries one end of the crankshaft 10. The other end of each crankshaft 10 is connected to a universal joint 9. The universal joints 9 are detachably connected to the ends of the shaft 8, from which power for turning the crankshafts 10 is obtained.

Each crankshaft 10, as shown in the drawings, is provided with three crank members indicated by the reference numerals 52, 53 and 54. Mounted on each of the cranks are suitable tedder bars 19, 20 and 21, each of which is provided with suitable bearings 28, 29 and 30, so as to reduce the friction between the cranks and said tedder bars. The tedder bars are pivotally connected at one end to links which are indicated by the reference numerals 38, 39 and 40, and the other ends are fitted with suitable forks 14 adapted to engage with the hay or other material to be thrown into the path of the hay loader.

The links 38, 39 and 40 which are pivotally connected to the ends of the tedder bars 19, 20 and 21, are mounted on the bracket member 18 in such a manner as to permit oscillation of each of the links thereon. As shown in Figure 3, the cranks of the crankshaft 10 are angularly spaced an equal distance apart. This arrangement provides for a more equalized load on the means for transmitting power to the crankshaft 10, and times the fork action so as to produce a more uniform throwing of the material to be gathered.

It can be readily seen from the showing in the drawings that upon rotation of the crankshafts 10, the forked tedder bars will be given a throwing motion. This motion of the forked tedder bars can be modified as desired, by varying the size of the links connecting the ends of the tedder bars with the bracing shaft 18.

In operation, the frame members 50 may be attached to the frame 35 of the hay loader by connecting braces 33 and 18 by means of bolts 34 and the brackets 17. The crankshafts 10, with their attached universal joints 9, may be secured to the shaft 8 by any suitable fastening means. After the frame members 50 are rigidly secured to the sides of the hay loader, and the chains 5 and 3 are connected to their respective driving and driven sprockets, the modified hay loader is ready for use.

As the hay loader with its attachments is drawn over the field containing the material to be gathered, power is transmitted from the wheels of the hay loader to the shaft 36, which in turn transmits power through the sprockets 6 to the chains 5. The chains 5, normally adapted to transmit power to the hay loading mechanism, are passed over sprockets 4, which together with sprocket 2 are fixed on shaft 1. The chain 3 transmits power from sprocket 2 to the sprocket 7 mounted on the shaft 8, which is connected by the universal joints 9 to the crankshafts 10 of the attachments. As the crankshafts 10 are rotated, a pitching or throwing action is imparted to the forked tedder bars, which causes the hay or other material engaged thereby to be thrown into the path of the hay loader, which picks up the same.

If it is found that the hay loader, with its attachments, is too bulky for the use to which it is to be put, the attachments can be readily removed therefrom by loosening the three connections, that is, at the bolts 34, the brackets 17 and the universal joints 9.

Thus it can be seen that my invention provides an attachment for a hay loader that can be readily attached or detached with a minimum amount of exertion on the part of the operator. Also, my invention provides an attachment for hay loaders which efficiently and effectively operates to throw hay or other material to be gathered into the path of the hay loader.

Another feature of my invention resides in its simiplicity and the few moving parts employed for accomplishing its intended purposes. With such an arrangement, the danger of moving parts becoming clogged by hay or other material being gathered, is minimized. The steady fork action of the above described attachment is a decided advantage in that it clears the field of the material to be gathered in, in a more even manner than heretofore attained.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. An attachment for a hay loader comprising a pair of frame members adapted to be fastened on each side of said hay loader, angularly thereto, a crankshaft carried by each of said frame members, a shaft mounted on said hay loader, means operatively connected with moving parts of said hay loader for rotating said shaft, universal means connecting said shaft with said crankshaft and means operable upon the rotation of said shaft for throwing material to be loaded in the path of said loader.

2. In combination with a hay loader, a plurality of frame members detachably connected to the frame of said hay loader, said frame members extending angularly from the sides of said hay loader, a crankshaft carried by each of said frame members, said crankshaft having a plurality of crank pins which are operably connected to a plurality of arms at substantially the mid points thereof, said arms having at one end fork members and being connected at the other end with link members which are pivotally connected to said frame members, and means connecting said crankshaft with a power source for moving said forks for throwing material into a path traversed by said loader.

3. In combination with a hay loader, a plurality of frame members detachably connected to the frame of said hay loader, said frame members extending angularly from the sides of said hay loader, a crankshaft carried by each of said frame members, said crankshaft having a plurality of crank pins which are operatively connected to a plurality of arms at substantially the mid points thereof, said arms having at one end fork members and being connected at the other end with link members which are pivotally connected to said frame members, and a plurality of universal joints connecting said crankshafts with a power source for moving said forks for throwing material into a path traversed by said loader.

4. In combination with a hay loader, a plurality of frame members detachably connected to the frame of said hay loader, said frame members extending angularly from the sides of said hay loader and carrying crankshafts adapted to operate means for throwing material into the path of said loader, said means comprising a plurality of arms connected to said crankshaft and provided on one end with a forked means for engagement with the material to be loaded and pivotally connected at the other end with a plurality of link members which are pivotally connected with said frame members, a shaft on said loader rotated by power supplied from said loader and means for directly connecting said crankshafts with said shaft.

5. In combination with a hay loader, a plurality of frame members detachably connected to the frame of said hay loader, said frame members extending angularly from the sides of said hay loader, a crankshaft carried by each of said frame members, said crankshaft having a plurality of crank pins angularly spaced about said crankshaft and which are operably connected to a plurality of arms at substantially the mid points thereof, said arms having at one end fork members and being connected at the other end with link members which are pivotally connected to said frame members, and means connecting said crankshafts with a power source for moving said forks for throwing material into a path traversed by said loader.

6. In combination with a hay loader, a plurality of frame members detachably connected to the frame of said hay loader, said frame members extending angularly from the sides of said hay loader, a crankshaft carried by each of said frame members, said crankshaft having a plurality of crank pins angularly spaced about said crankshaft and which are operably connected to a plurality of arms at substantially the mid points thereof, said arms having at one end fork members and being connected at the other end with link members which are pivotally connected to said frame members, and means connecting said crankshafts with a power source for moving said forks for throwing material into a path traversed by said loader, said angularly spaced crank pins being equally spaced about said crankshaft so as to impart a steady throwing action to said fork members.

7. In combination with a hay loader, a plurality of extension members adapted to be detachably connected thereto, said extension members each comprising a frame carrying a plurality of forked arms which are pivotally connected thereto, a crankshaft having a plurality of cranks connected to said arms, and means for rotating said crankshaft for imparting a pitching action to said forked arms.

FRANK SCHABLOSKI.